United States Patent
Zhang

(10) Patent No.: US 8,345,713 B2
(45) Date of Patent: Jan. 1, 2013

(54) METHODS AND APPARATUS FOR CONTENT SCRAMBLING IN A COMMUNICATIONS SYSTEM

(75) Inventor: Muxiang Zhang, Winchester, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 424 days.

(21) Appl. No.: 11/588,065

(22) Filed: Oct. 25, 2006

(65) Prior Publication Data
US 2008/0101414 A1 May 1, 2008

(51) Int. Cl.
*H04J 3/00* (2006.01)
(52) U.S. Cl. ............ 370/476; 380/277; 380/44; 380/45; 380/46; 380/47
(58) Field of Classification Search .......... 370/464, 370/474, 476; 380/277, 44–47
See application file for complete search history.

(56) References Cited

U.S. PATENT DOCUMENTS

| | | | |
|---|---|---|---|
| 5,345,508 A * | 9/1994 | Lynn et al. ............ | 380/46 |
| 6,028,933 A | 2/2000 | Heer et al. | |
| 6,986,045 B2 * | 1/2006 | Campagna .............. | 713/170 |
| 2001/0033656 A1 | 10/2001 | Gligor et al. | |
| 2002/0101989 A1 * | 8/2002 | Markandey et al. ...... | 380/210 |
| 2004/0228401 A1 | 11/2004 | Chen | |
| 2004/0247126 A1 | 12/2004 | McClellan | |
| 2005/0138403 A1 * | 6/2005 | Volp et al. ............. | 713/193 |
| 2005/0190911 A1 * | 9/2005 | Pare et al. ............. | 380/30 |
| 2006/0056625 A1 * | 3/2006 | Nakabayashi et al. ..... | 380/46 |
| 2007/0130069 A1 * | 6/2007 | Kay et al. ............. | 705/50 |
| 2008/0187134 A1 * | 8/2008 | Nourry et al. .......... | 380/29 |

FOREIGN PATENT DOCUMENTS

| | | |
|---|---|---|
| WO | WO-97/18654 | 5/1997 |
| WO | WO-00/76118 | 12/2000 |
| WO | WO-2006/008362 | 1/2006 |
| WO | WO-2006/086554 | 8/2006 |

OTHER PUBLICATIONS

Menezes, et al., "Handbook of Applied Cryptography", Handbook of Applied Cryptography; [CRC Press Series on Discrete Mathematics and its Applications], CRC Press, Boca Raton, FL, USA, pp. 223-282, Jan. 1, 1997.
Schneier, "Applied Cryptography, protocols, algorithms amd source code in C", second edition, 2.3 One-Way Functions, Applied Cryptography, XX, XX, Oct. 18, 1995, pp. 29-31, 193., Oct. 18, 1995.

* cited by examiner

*Primary Examiner* — Charles C Jiang

(57) ABSTRACT

Methods and apparatus for improved scrambling and/or descrambling of packets in a communications network are described, e.g., improved scrambling/descrambling of MPEG-2 transport stream packets over an Internet Protocol network. Advance Encryption Standard (AES) under cipher block chaining is utilized in scrambling some transport stream packets. Methods and apparatus for computing an initialization vector or vectors used by the AES are also described. The initialization vector can be set to either a constant or a programmable random number. Scrambling methods and apparatus directed to scrambling solitary termination blocks with a reduced size packet payload e.g., less than 128 bits in an MPEG-2 transport stream packet, are also described. Various features are useful for and can be implemented in set-top boxes and IPTV scramblers in the headsets.

9 Claims, 18 Drawing Sheets

| FIGURE 11A |
| FIGURE 11B |
| FIGURE 11C |
| FIGURE 11D |

METHODS AND APPARATUS FOR CONTENT SCRAMBLING IN A COMMUNICATIONS SYSTEM

BACKGROUND

To protect video/audio content from unauthorized consumption, encryption techniques are usually used to scramble video/audio content during delivery or during recording. The Digital Video Broadcasting (DVB) standard has specified a common scrambling algorithm (CSA) to scramble video/audio transport stream packets encoded in the form of MPEG-2. The DVB common scrambling algorithm is a proprietary algorithm and details of the algorithm have not been published. However, it has long been stipulated in the communications industry that the DVB common scrambling algorithm is weak and should be replaced by a stronger encryption algorithm based on modern cryptographic techniques.

The US Society of Cable Telecommunications Engineers (SCTE) has standardized a method, referred to as SCTE-52, for scrambling MPEG-2 transport stream packets using the Data Encryption Standard (DES) under Cipher Block Chaining (CBC) mode. However, the SCTE scrambling standard does not specify how to generate the initialization vector (IV), a parameter which will be used by the DES encryption under cipher block chaining mode. Moreover, the DES encryption algorithm is no longer a strong algorithm due to a number of rigorous cryptanalysis during the last two decades. For this reason, the common scrambling standard developed by the Advance Television Systems Committee (ATSC) replaces DES with the cryptographically stronger triple-DES (TDES) with 168-bit key. The ATSC common scrambling standard also mandates that the initialization vector for the triple-DES under cipher block chaining mode be all zero. Nevertheless, both the DES algorithm and triple-DES algorithm are inferior to the Advanced Encryption Standard (AES) with respect to both security strength and implementation efficiency. In view of the above, it would be beneficial if methods and apparatus were developed which utilized AES for the scrambling of video/audio transport stream packets over Internet Protocol (IP) networks.

DETAILED DESCRIPTION OF PREFERRED EMBODIMENTS

Various embodiments are directed to methods and apparatus for scrambling transport stream packets, e.g., MPEG-2, transport stream packets over an Internet protocol (IP) network. In accordance with various embodiments, the Advance Encryption Standard (AES) under cipher block chaining (CBC) is used to scramble transport packet streams, e.g., MPEG-2 transport stream packets. An exemplary method includes computation of an initialization vector (IV) used by the AES cipher block chaining mode. In some embodiments, the initialization vector can be set to either a constant number or to a programmable random number. Some embodiments relate to a method for scrambling a residual block in a transport stream packet, e.g., a residual block of less than 128 bits (16 bytes) in an MPEG-2 transport stream packet. Some embodiments also relate to a method for scrambling a solitary termination block in a transport stream packet, e.g., a solitary termination block of less than 128 bits (16 bytes) in an MPEG-2 transport stream packet.

Exemplary scrambling of MPEG-2 transport stream packets in accordance with an embodiment will be described. An exemplary method of scrambling uses AES under cipher block chaining mode to scramble MPEG-2 transport stream packets. Each MPEG-2 transport stream packet has a fixed length of 188 bytes. A MPEG-2 transport stream packet includes a header of 4 bytes, an optional adaptation field of varying length, and a payload of at least 1 byte. In this exemplary embodiment, the payload of the transport stream packet is scrambled, while the header and the optional adaptation field are not scrambled.

Figure 1:
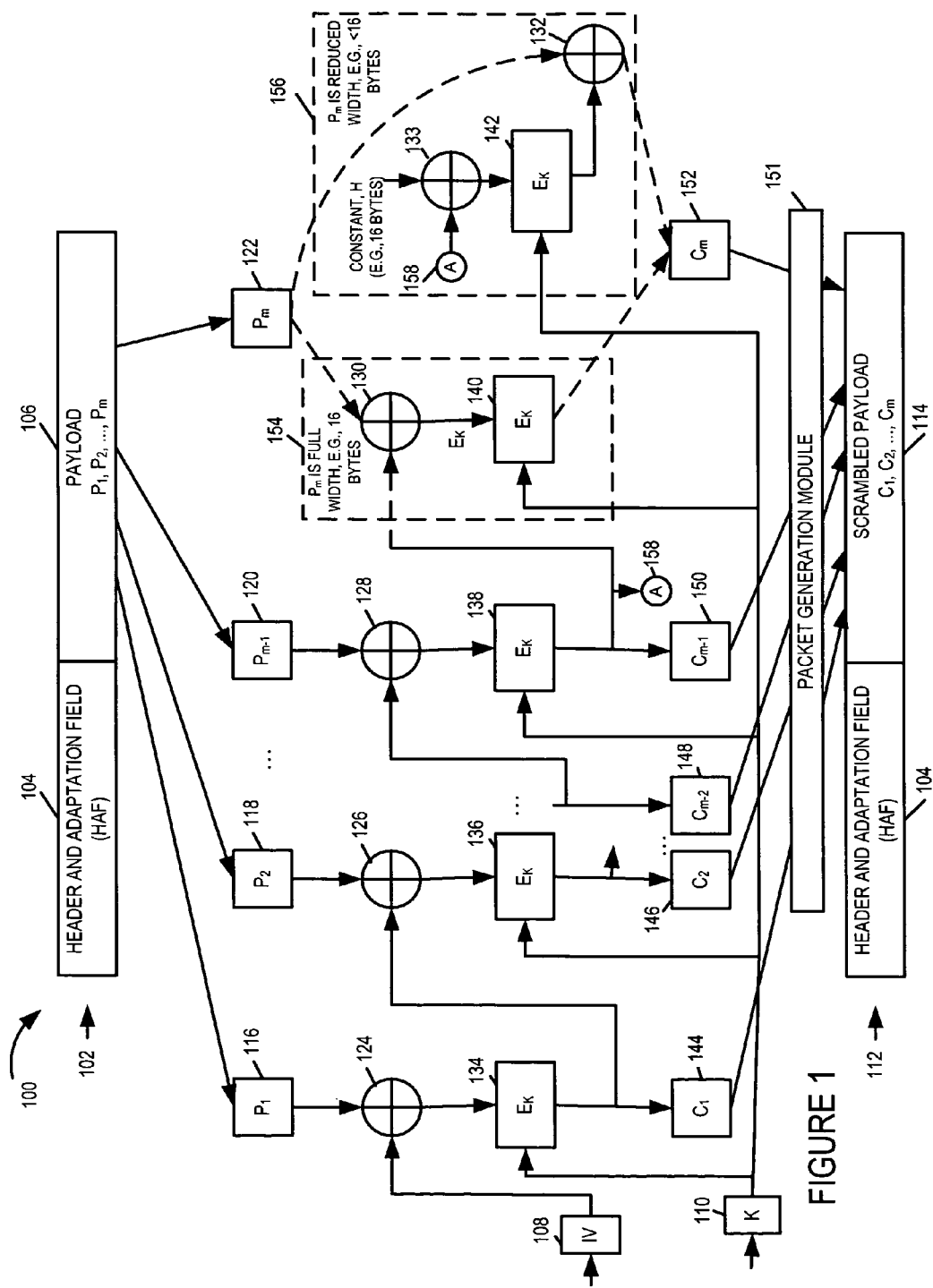
FIG. 1 includes a drawing used to illustrate scrambling, e.g., of a MPEG-2 transport stream packet, in accordance with various embodiments.

FIG. 1 includes a drawing 100 used to illustrate the scrambling of a MPEG-2 transport stream packet 102. Input MPEG-2 transport stream packet 102 includes a Header and Adaptation Field (HAF) portion 104 and a payload portion 106. In FIG. 1, $E_k$ blocks (134, 136, 138, ..., 140, 142) denote modules using the AES encryption algorithm under the control of scrambling key K 110. In some embodiments, a single $E_k$ module is used corresponding to modules (134, 136, 138, ..., 140, 142), e.g., with the input being switched over time. Block IV 108 denotes an initialization vector used in the scrambling method. There are also bit-wise exclusive OR operation modules (124, 126, ..., 128, 130, 132) corresponding to portions of the payload 106. In some embodiments, a single exclusive OR module is used corresponding to modules (124, 126, 128, 130, 132), e.g., with the inputs being switched over time. The scrambling key K 110 and the initialization vector IV 108 are each 16 bytes or 128 bits wide. To scramble an MPEG-2 transport stream packet, the payload is divided into 16 byte-blocks, the last block, i.e., the residual block, may have a length of less than 16 bytes. Thus payload 102 is divided into blocks ($P_1$ 116, $P_2$ 118, ..., $P_{m-1}$ 120), each being a 16 byte block, and block $P_m$ 122 being a residual block of 16 or less bytes. If last block $P_m$ is 16 bytes, then module 154 is used for scrambling; however if $P_m$ is less than 16 bytes, then module 156 is used for scrambling.

First payload block $P_1$ 116 is bit-wise exclusive-OR-ed with IV 108 by module 124, and the result is encrypted by $E_k$ module 134 to produce the first ciphertext block $C_1$ 144. Next, the second payload block $P_2$ 118 is exclusive-OR-ed with the first ciphertext block $C_1$ 114 by module 126, and the result is encrypted by $E_k$ module 136 to produce the second ciphertext block, $C_2$ 146. This continues until the generation of the (m-1)th ciphertext block $C_{m-1}$ 150, where the (m-1)th payload block $P_{m-1}$ 120 is exclusive-OR-ed with the (m-2)th ciphertext block $C_{m-2}$ 148, and the result is encrypted by $E_k$ module 138 to produce the (m-1)th ciphertext block, $C_{m-1}$ 150.

If the length of the last payload block, $P_m$ 122, has a length equal to 16 bytes, then the last ciphertext block $C_m$ 152 is generated in the same way as that for $C_{m-1}$, that is $C_m = E_k(P_m$ exclusive OR-ed with $C_{m-1}$). In other words, the $m^{th}$ payload block $P_m$ 122 is exclusive-OR-ed with the (m-1)th ciphertext block $C_{m-1}$ 150 by module 130, and the result is encrypted by $E_k$ module 140 to produce the mth ciphertext block, $C_m$ 152.

If the length of the last payload block, $P_m$ 122, has a length, denoted by $\tau$, of less than 16 bytes, then an input constant, H (e.g., H=0, or H=7884fe536c3588b73c2f604e4813fbe1 in Hexadecimal format), is exclusive OR-ed with the ciphertext block $C_{m-1}$ by module 133 and the result of the exclusive of is encrypted by module 142 by $E_k$ under the control of the scrambling K. The ciphertext block $C_m$ 152 is generated by module 132 taking bit-wise exclusive OR of $P_m$ 122 with the $\tau$ least significant bits of the encryption $E_k(C_{m-1} \oplus H)$. The input constant H may be a pre-determined number or set, e.g., based on some input.

The generated ciphertext blocks ($C_1$ 114, $C_2$ 146, ..., $C_{m-2}$ 148, $C_{m-1}$ 150, $C_m$ 152), representing scrambled payload 114, are reassembled by packet generation module 151 with a copy of the unscrambled header and adaptation field 104 to form the scrambled MPEG-2 transport stream packet 112 which may be stored, e.g., in memory, prior to transmission, decoding and/or other processing.

Figure 2:
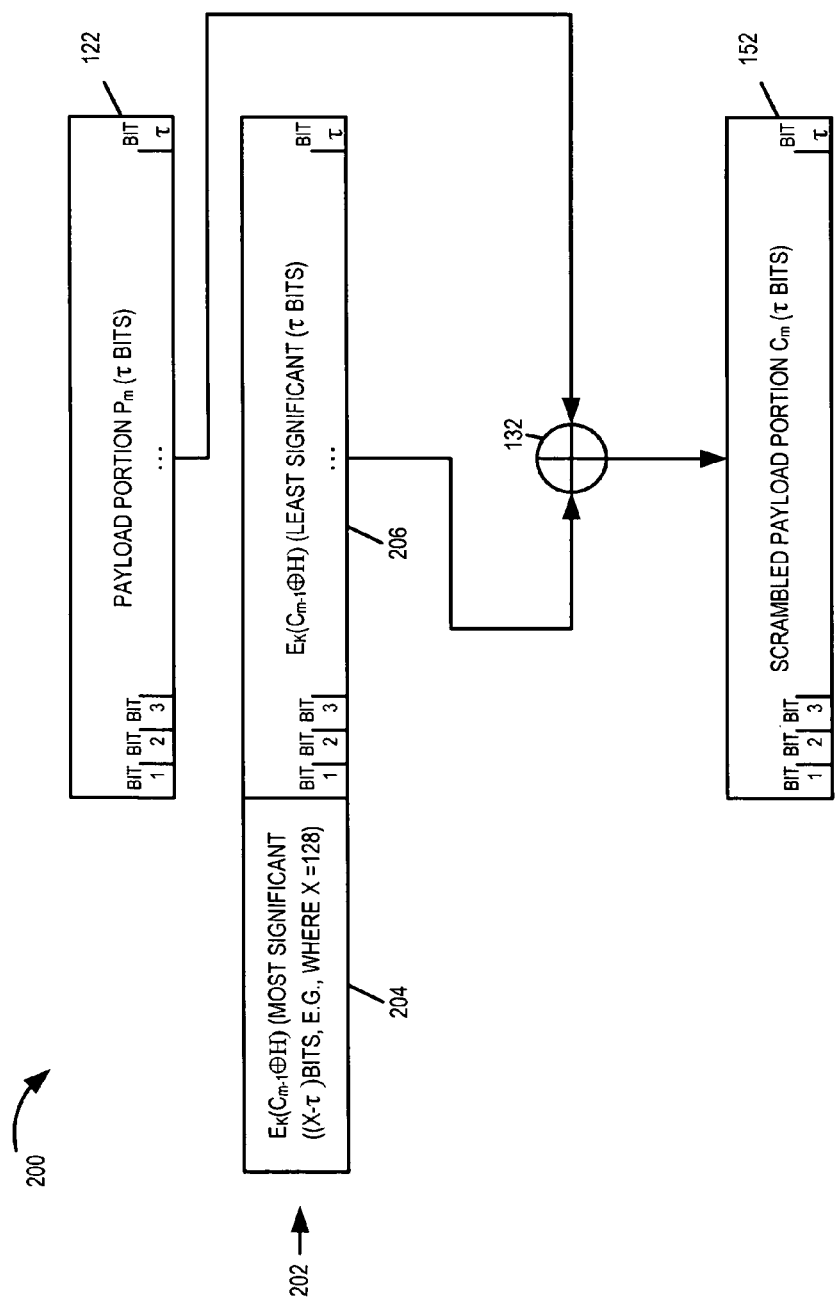
FIG. 2 is a drawing illustrating exemplary scrambling related operations, in accordance with various embodiments, wherein the width of the last portion of a packet payload, called residual block, is of a reduced size.

FIG. 2 is a drawing 200 illustrating exemplary operations performed, e.g., by module 156, wherein the width ($\tau$) of the last payload portion $P_m$ 122 is of a reduced size, e.g., less than 128 bits. Output of encryption module 142 is $E_k(C_{m-1} \oplus H)$_202 which includes a most significant portion 204 and a least significant portion 206. The payload portion 122 is bit-wise exclusive OR-ed by module 132 with least significant portion 206 resulting in scrambled payload portion $C_m$ ($\tau$ bits wide) 152.

Figure 3:
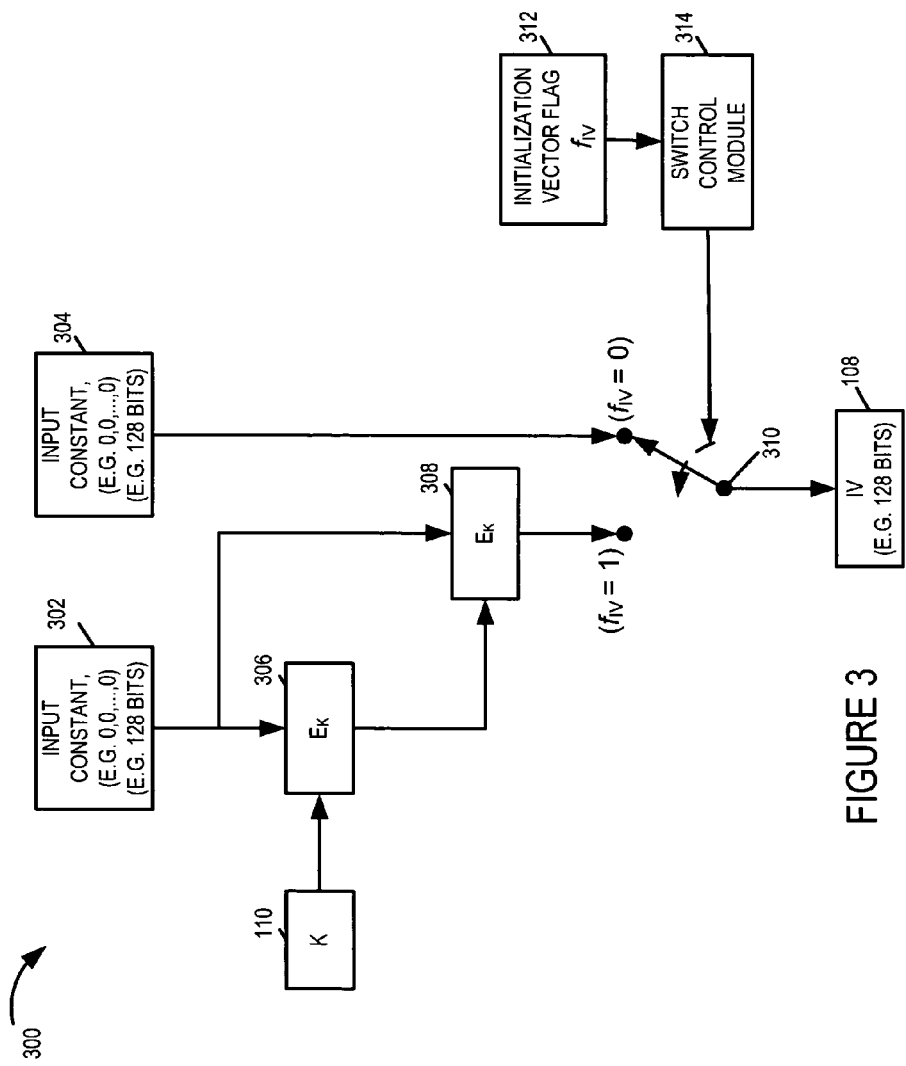
FIG. 3 is a drawing illustrating an exemplary method for generating an Initialization Vector (IV) in accordance with various embodiments.

FIG. 3 is a drawing 300 illustrating an exemplary method for generating an Initialization Vector (IV) in accordance with various embodiments. IV 108 can be set either to a constant or a programmable random number. In FIG. 3, initialization vector flag ($f_{IV}$) 312 is a one bit flag controlling the generation of IV and may be received in an MPEG-2 transport or program stream. The flag can change in value over time, e.g., on a packet or program basis. Initialization vector flag 312 is an input to switch control module 314 which controls switch 312. When $f_{IV}$ 312 is equal to 0, IV 108 is set to input constant 304, e.g., 0. When $f_{IV}$ 312 is equal to 1, the AES encryption algorithm $E_k$ of module 306 first encrypts the input constant 302, e.g., 0, under the control of scrambling key K 110. Then, the AES encryption algorithm $E_k$ of module 308 encrypts input constant 302, e.g., 0, under the control of a new key $E_k$(constant 302), e.g., $E_k(0)$, and the resultant ciphertext is assigned to IV 108. The flag bit IV can be set for each program or for each MPEG-2 transport stream packet in the program. The flag bit can be delivered to a descrambler in the receiving device through signaling messages, e.g., Entitlement Control Message (ECM) or Entitlement Management Message (EMM), or it may be configured to a default value (e.g., $f_{IV}$=0) during bootstrapping of the receiving device. In some embodiments, input constant 302 is the same as input constant 304. In some embodiments, input constant 302 may be, and sometimes is different from input constant 304. It should be appreciated that the output of encryption module 308 can be considered a first value, the input constant 304 a second value and the input constant 302 a third value. The input constants 302, 304 may be predetermined values or set, e.g., based on some input. These values 302, 304 can be the same or different.

Figure 4:
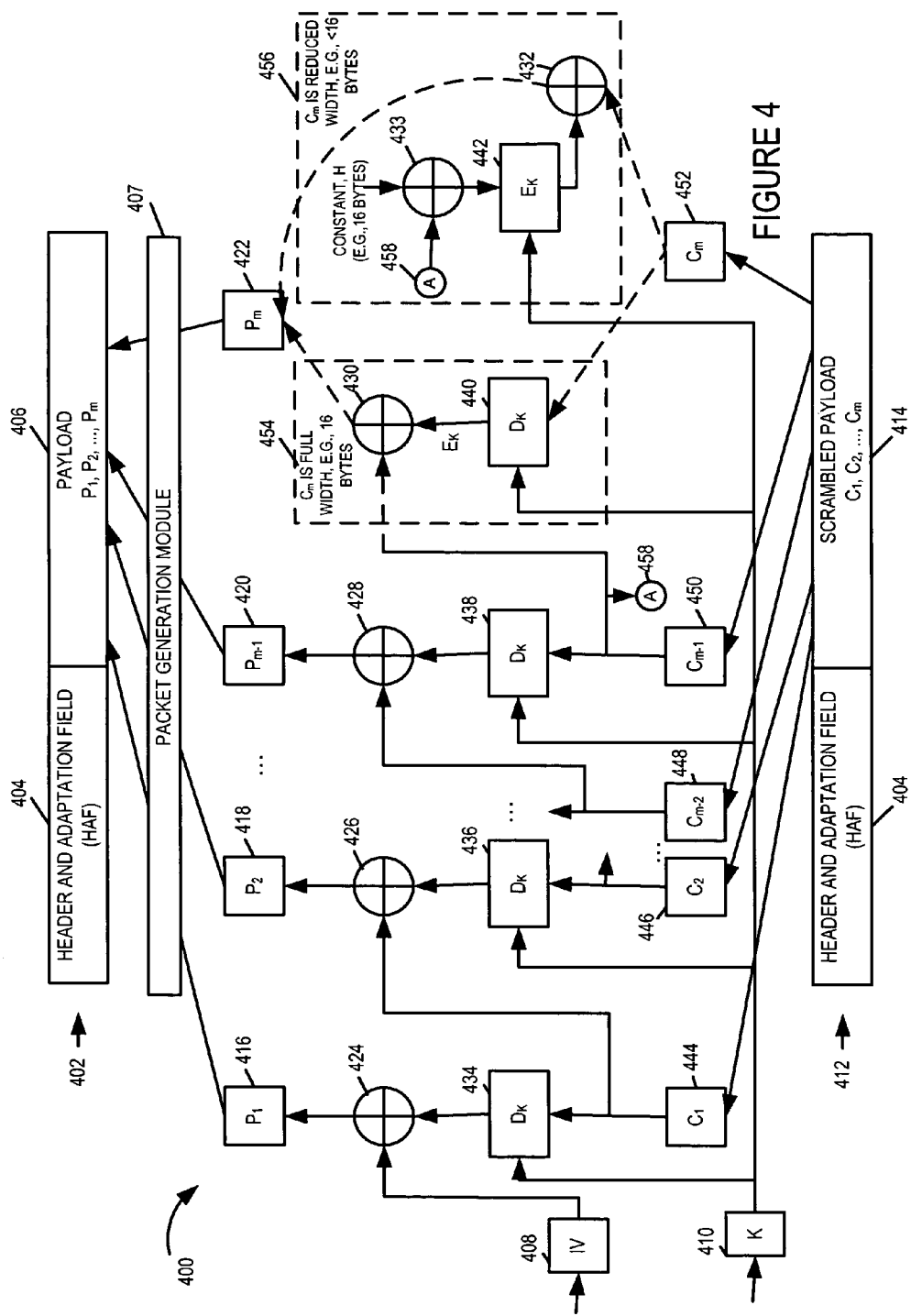
FIG. 4 includes a drawing used to illustrate the descrambling, e.g., of a scrambled MPEG-2 transport stream packet, in accordance with various embodiments.

FIG. 4 includes a drawing 400 used to illustrate the descrambling of a scrambled MPEG-2 transport stream packet 412. Input scrambled MPEG-2 transport stream packet 412 includes a Header and Adaptation Field (HAF) portion 404 and a scrambled payload portion 414. In FIG. 4, $D_k$ blocks (434, 436, ..., 438, 440) denote modules using the AES decryption algorithm under the control of scrambling key K 410. In some embodiments, a single $D_k$ module is used corresponding to modules (434, 436, 438, 440), e.g., with the input being switched over time. $E_k$ block 442 denotes a module using the AES encryption algorithm under the control of scrambling key K 410. Block IV 408 denotes an initialization vector used in the descrambling method. There are also bit-wise exclusive OR operation modules (424, 426, ..., 428, 430, 432) corresponding to portions of the scrambled payload 414. In some embodiments, a single exclusive OR module is used corresponding to modules (424, 426, 428, 430, 432), e.g., with the inputs being switched over time. The scrambling key K 410 and the initialization vector IV 408 are each 16 bytes or 128 bits wide. To descramble an MPEG-2 transport stream packet, the payload is divided into 16 byte-blocks, the last block may have a length of less than 16 bytes. Thus payload 414 is divided into blocks ($C_1$ 444, $C_2$ 446, ..., $C_{m-1}$ 450), each being a 16 byte ciphertext block, and the residual block $C_m$ 452 being a ciphertext block of 16 or less bytes. If last block $C_m$ is 16 bytes, then module 454 is used for descrambling; however if $C_m$ is less than 16 bytes, then module 456 is used for descrambling.

First ciphertext block $C_1$ 444 is decrypted by $D_k$ module 434, and the result of the decryption is bit-wise exclusive OR-ed by module 424 with IV 408 to produce the first plaintext block $P_1$ 416. Next, the second ciphertext block $C_2$ 446 is decrypted by $D_k$ module 436, and the result of the decryption is bit-wise exclusive OR-ed by module 426 with $C_1$ 444 to produce the second plaintext block $P_2$ 418. This continues until the generation of the (m-1)th plaintext block $P_{m-1}$ 420, where the $(m-1)^{th}$ ciphertext block $C_{m-1}$ 450 is decrypted by module $D_k$ 438, and the result of the decryption is bit-wise exclusive OR-ed with $C_{m-2}$ 448 by module 428 to produce the $(m-1)^{th}$ plaintext block, $P_{m-1}$ 420.

If the length of the last ciphertext block, $C_m$ 452, has a length equal to 16 bytes, then the last plaintext block $P_m$ 422 is generated in the same way as that for $P_{m-1}$, that is $P_m$ is equal to $D_k(C_m)$ exclusive OR-ed with $C_{m-1}$. In other words, the $m^{th}$ ciphertext block $C_m$ 452 is decrypted by $D_k$ module 440, and the result of the decryption is bit-wise exclusive-OR-ed with the $(m-1)^{th}$ ciphertext block $C_{m-1}$ 450 by module 430 to produce the $m^{th}$ plaintext block, $P_m$ 422.

If the length of the last payload block, $C_m$ 452, has a length, denoted by τ, of less than 16 bytes, then an input constant, H (e.g., H=0, or H=7884fe536c3588b73c2f604e4813fbe1 in Hexadecimal format), is exclusive OR-ed with the ciphertext block $C_{m-1}$ by module 433 and the result of the exclusive OR is encrypted by module 442 by $E_k$ under the control of the scrambling K. The plaintext block $P_m$ 422, which also has a length τ, is generated by module 432 taking bit-wise exclusive OR of $C_m$ 452 with the τ least significant bits of the encryption $E_k(C_{m-1} \oplus H)$. The input constant H may be a predetermined number or set, e.g., based on some input.

The generated plaintext blocks ($P_1$ 416, $P_2$ 418, ..., $P_{m-1}$ 420, $P_m$ 422), representing descrambled payload 406, are reassembled by packet generation module 407 with a copy of the unscrambled header and adaptation field 404 to form the descrambled MPEG-2 transport stream packet 402. The header and adaptation field 404 includes at least one header field and one or more additional fields.

Figure 5:
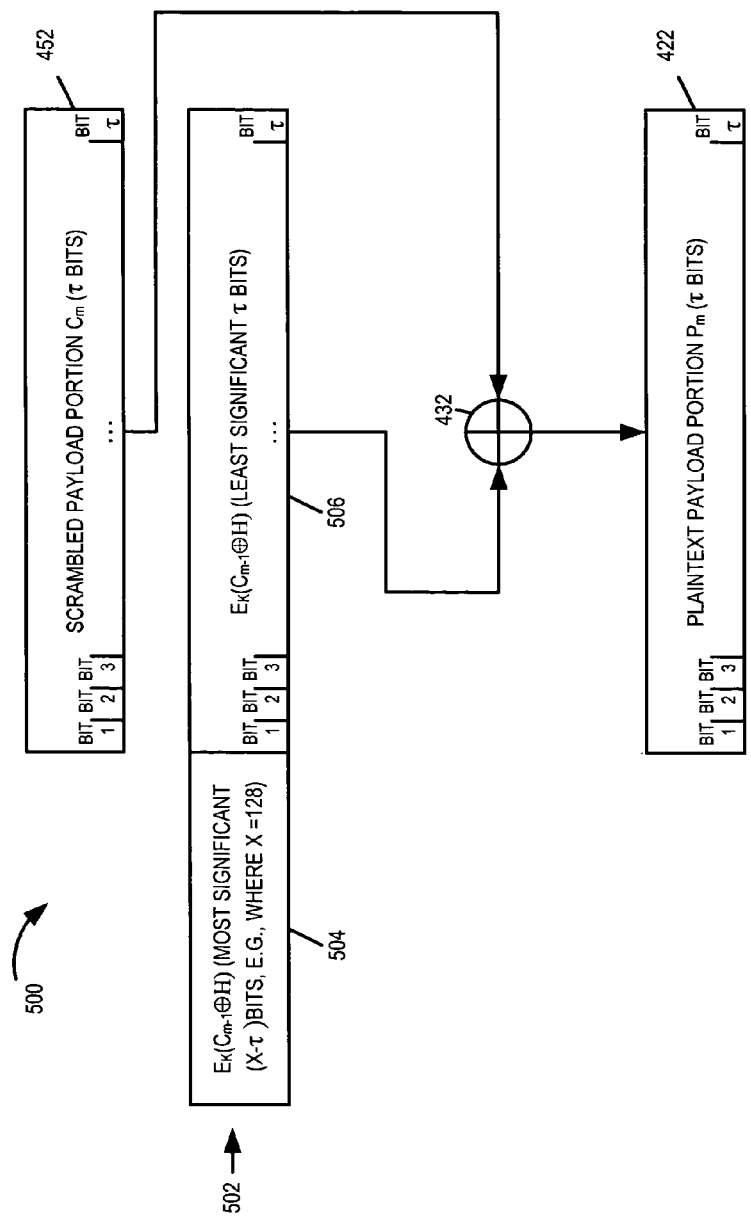
FIG. 5 is a drawing illustrating exemplary descrambling related operations performed, in accordance with various embodiments, wherein the width of the last ciphertext portion, also referred to as a scrambled residual block, is of a reduced size.

FIG. 5 is a drawing 500 illustrating exemplary operations performed, e.g., by module 456, wherein the width (τ) of the last ciphertext portion, also referred to as a scrambled payload portion, $C_m$ 452 is of a reduced size, e.g., less than 128 bits. Output of encryption module 442 is $E_k(C_{m-1} \oplus H)$ 502 which includes a most significant portion 504 and a least significant portion 506. The scrambled payload portion 452 is bit-wise exclusive OR-ed by module 432 with least significant portion 506 resulting in plaintext payload portion $P_m$ (τ bits wide) 422.

Figure 6:
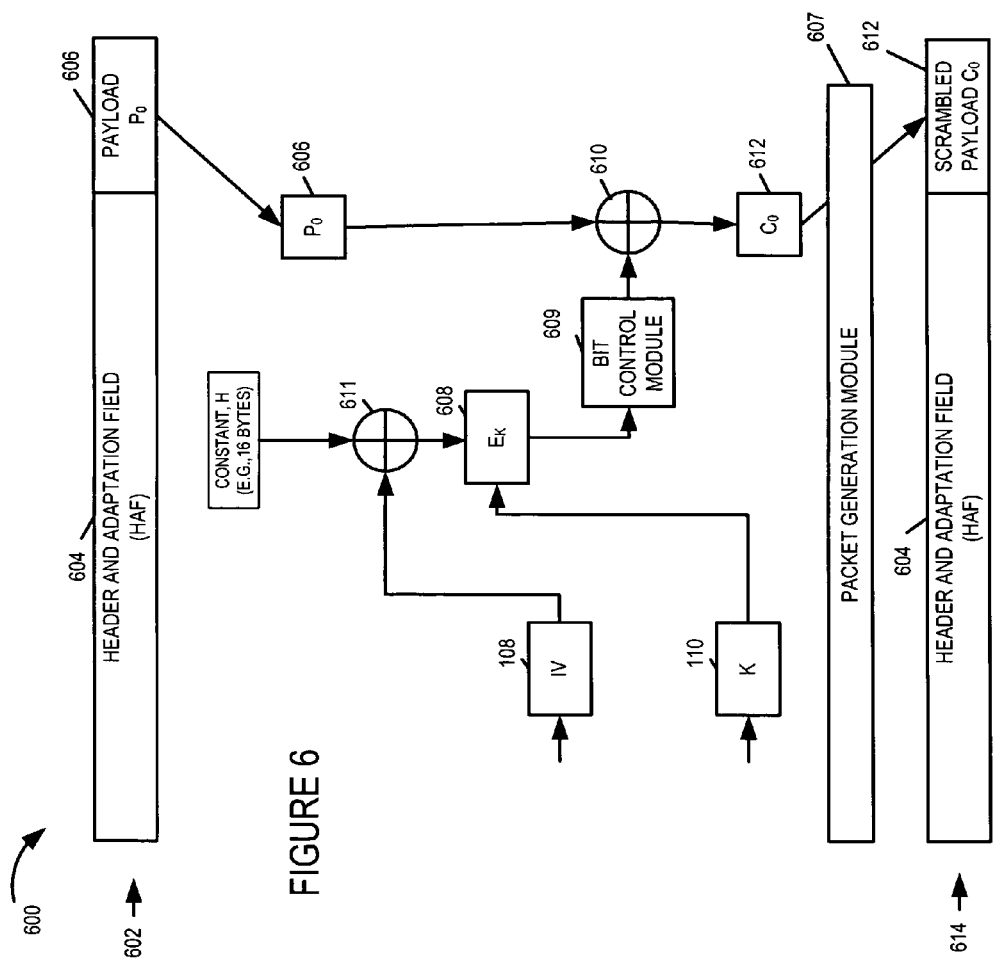
FIG. 6 is a drawing illustrating an exemplary method for scrambling a solitary termination block in accordance with various embodiments.

Due to the varying length of the optional adaptation field, an MPEG-2 transport stream packet may contain a very small payload of less than 16 bytes. In such a scenario, the payload would be the first and last block, which is called a solitary termination block. FIG. 6 is a drawing 600 illustrating an exemplary method for scrambling a solitary termination block in accordance with various embodiments. Input MPEG-2 transport stream packet 602 includes a Header and Adaptation Field (HAF) portion 604 and a payload portion 606, which is a solitary termination block denoted $P_0$. In FIG. 6, $E_k$ block 608 denote a module using the AES encryption algorithm under the control of scrambling key K 110. Block IV 108 denotes an initialization vector used in the scrambling method. There is also a bit-wise exclusive OR operation module 610. The scrambling key K 110 and the initialization vector IV 108 are each 16 bytes or 128 bits wide. Let τ denote the length of $P_0$, e.g., the number of bits in $P_0$. An input constant, H (e.g., H=0, or H=7884fe536c3588b73c2f604e4813fbe1 in Hexadecimal format), is exclusive OR-ed by module 611 with the Initialization Vector IV 108 to produce an encryption input. Module 608 encrypts the value of the exclusive OR of the input constant H with IV 108 under the control of key 110. The ciphertext block $C_0$ 612 is computed by module 610 taking the bit-wise exclusive-OR of $P_0$ 606 and the least significant τ bits of the encryption, i.e., $E_k(IV \oplus H)$. The bit control module 609 is used to select the least significant τ bits of the encryption output as an input to the exclusive OR module 610. The generated ciphertext blocks $C_0$ 612, representing scrambled payload 606, is reassembled with the unscrambled header and adaptation field 604 by packet generation module 607 to form the scrambled MPEG-2 transport stream packet 614. While in the FIG. 6 embodiment, the encryption input is the output of the exclusive OR module 611 in other embodiments the initialization vector 108 is used as the encryption input and the exclusive OR module 611 may be omitted.

Figure 7:
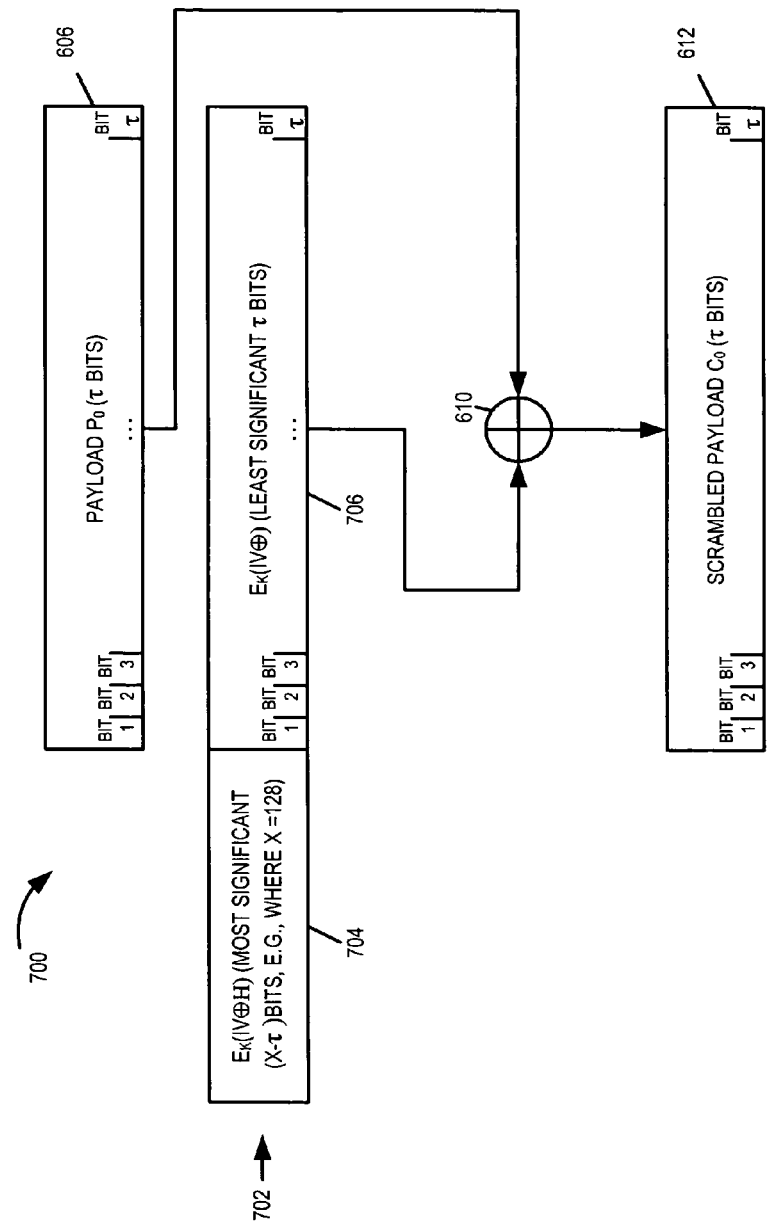
FIG. 7 is a drawing illustrating exemplary operations performed in accordance with FIG. 6.

FIG. 7 is a drawing 700 illustrating exemplary operations performed in accordance with FIG. 6. Encryption module 608 outputs $E_k(IV \oplus H)$ which includes a most significant portion 704 and a least significant portion 706. The least significant portion of $E_k(IV \oplus H)$ 706 which is τ bits wide is bit-wise exclusive-ORed by module 610 with the payload $P_0$ 606, which is also τ bits wide. The result is scrambled payload $C_0$ 612, which is τ bits wide.

Figure 8:
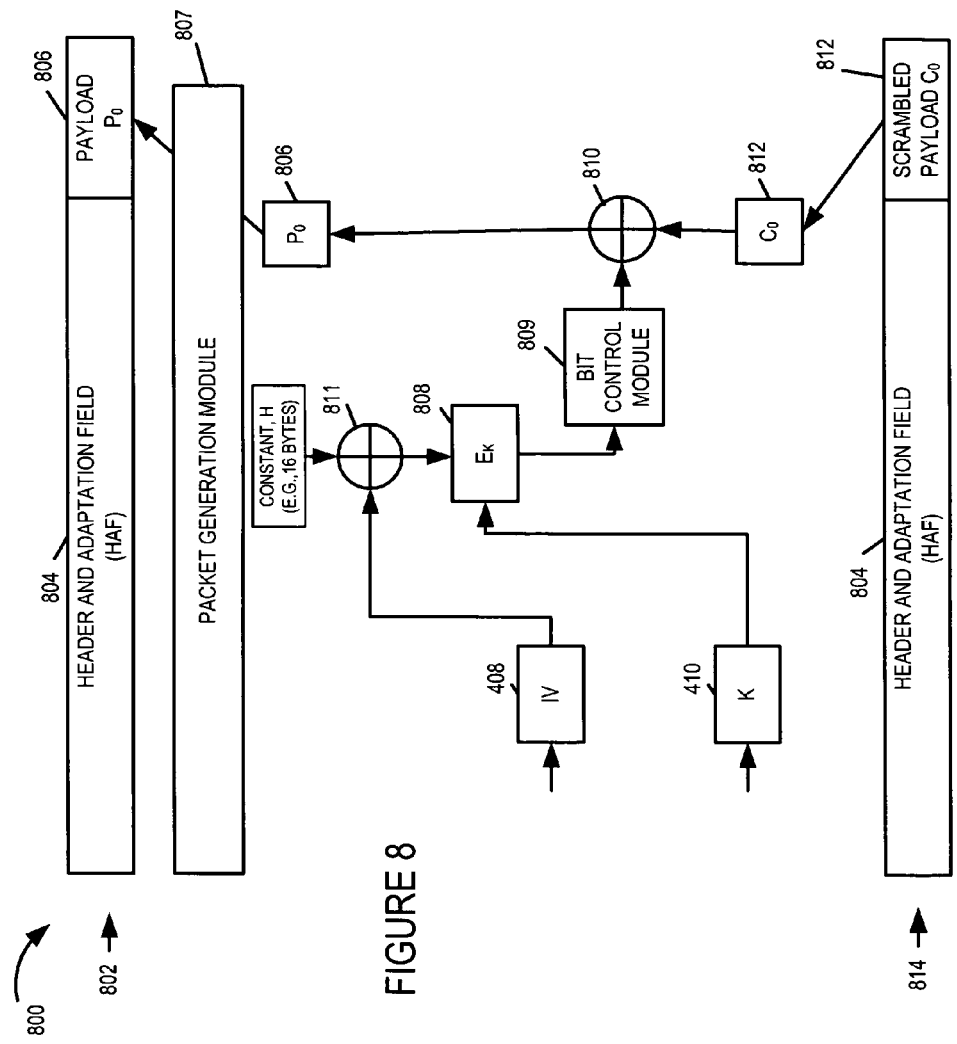
FIG. 8 is a drawing illustrating an exemplary method for descrambling a solitary termination block in accordance with various embodiments.

FIG. 8 is a drawing 800 illustrating an exemplary method for descrambling a solitary termination block in accordance with various embodiments. Input MPEG-2 scrambled transport stream packet 814 includes a Header and Adaptation Field (HAF) portion 804 and a scrambled payload portion 812, which is a solitary termination block denoted $C_0$. In FIG. 8 $E_k$ block 808 denote a module using the AES encryption algorithm under the control of scrambling key K 410. Block IV 408 denotes an initialization vector used in the descrambling method. There is also exclusive OR operation module 810. The scrambling key K 410 and the initialization vector IV 408 are each 16 bytes or 128 bits wide. Let τ denote the length of $C_0$, e.g., the number of bits in $C_0$. An input constant, H (e.g., H=0, or H=7884fe536c3588b73c2f604e4813fbe1 in Hexadecimal format), is exclusive OR-ed by module 811 with the Initialization Vector IV 408. Module 808 encrypts of the value of the exclusive OR of the input constant H with IV 408 under the control of key 410. In this case, the output of exclusive OR module 811 is an encryption input to encryption module 808. The plaintext block $P_0$ 806 is computed by module 810 taking the bit-wise exclusive-OR of $C_0$ 812 and the least significant τ bits of the encryption, i.e., $E_k(IV \oplus H)$. The generated plaintext block $P_0$ 806, representing a descrambled payload, is reassembled by packet generation module 807 with a copy of the unscrambled header and adaptation field 804 to form the descrambled MPEG-2 transport stream packet 802. The unscrambled header and adaptation field 804 includes at least one header field and one or more additional fields. While in the FIG. 8 embodiment the encryption input to module 808 is produced by exclusive OR module 811, in other embodiments the initialization vector generated by module 408 is used as the encryption input and the exclusive OR module 811 is omitted.

Figure 9:
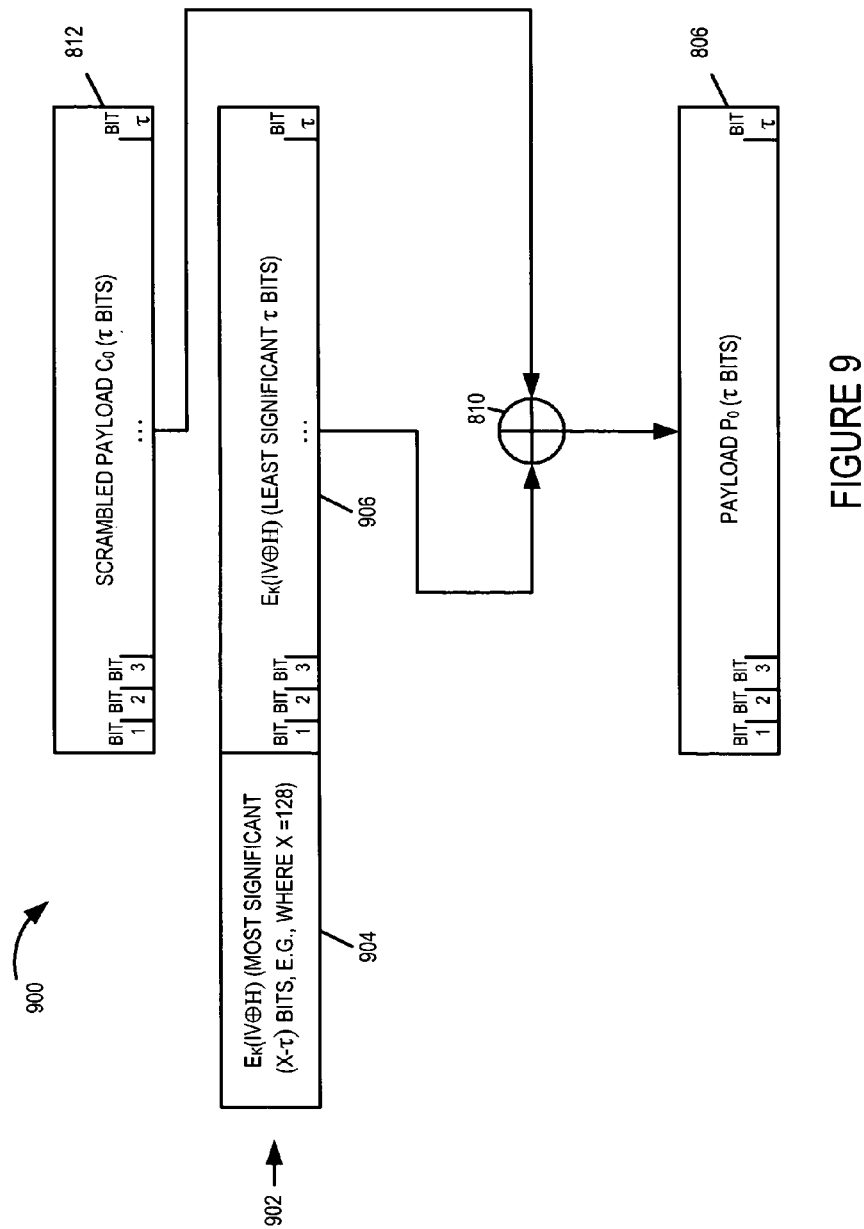
FIG. 9 is a drawing illustrating exemplary operations performed in accordance with FIG. 8.

FIG. 9 is a drawing 900 illustrating exemplary operations performed in accordance with FIG. 8. Encryption module 808 outputs $E_k(IV \oplus H)$ 902 which includes a most significant portion 904 and a least significant portion 906. The least significant portion of $E_k(IV \oplus H)$ 906 which is τ bits wide is selected by the bit control module 809 and is bit-wise exclusive-ORed by module 810 with the scrambled payload $C_0$ 812, which is also τ bits wide. The result is descrambled payload $P_0$ 806, which is τ bits wide.

Figure 10:
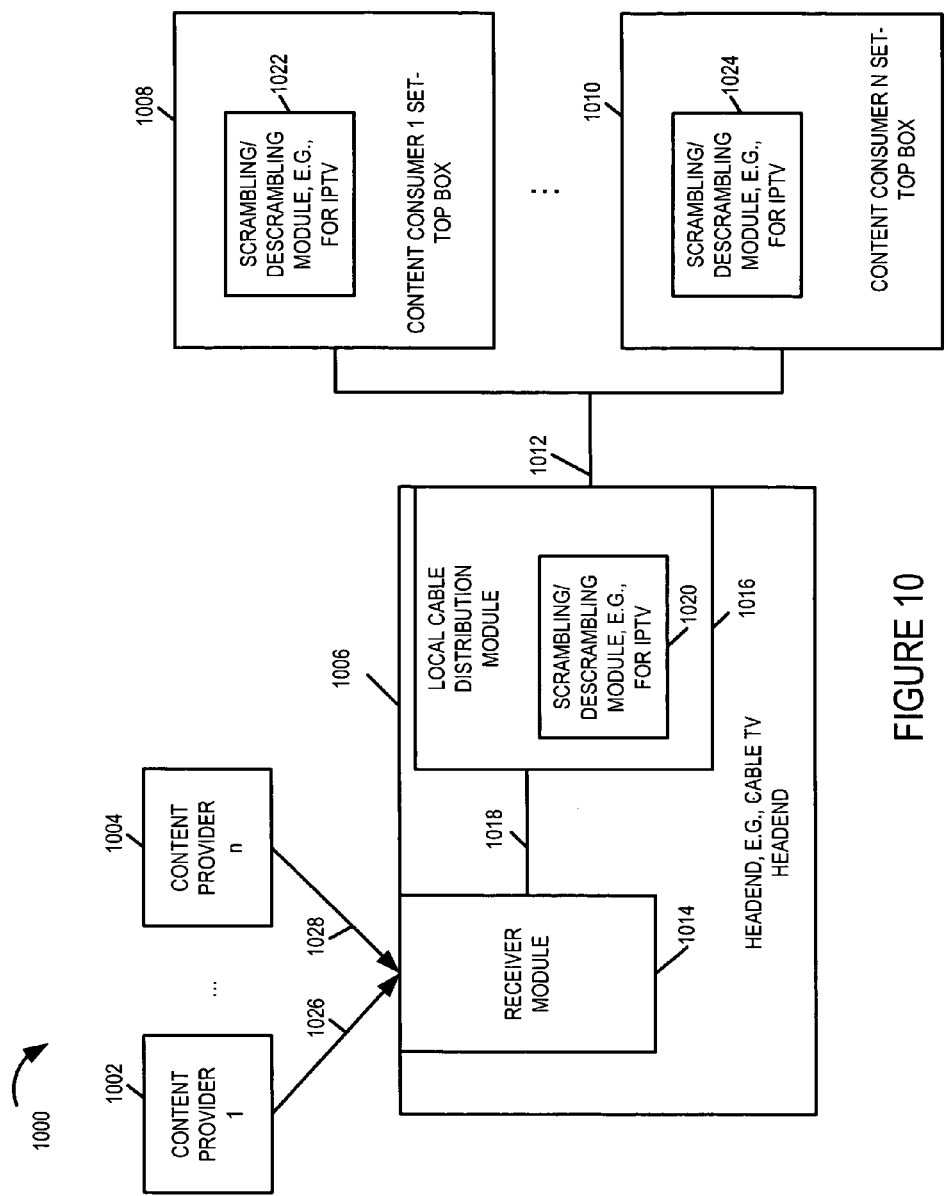
FIG. 10 is a drawing of an exemplary communications system.

FIG. 10 is a drawing 1000 of an exemplary communications system. For example, exemplary communications system 1000 may be used to distribute cable TV information from content providers to consumers, and at least some of the communicated signals include scrambled packets, e.g., scrambled MPEG-2 transport stream packets. Exemplary communications system 1000 includes a plurality of content providers (content provider 1 1002, ..., content provider n 1004), a headend 1006, e.g., a cable TV headend, and a plurality of content consumer set-top boxes (content consumer 1 set-top box 1008, ..., content consumer N set-top box 1010). Headend 1006 is coupled to the set-top boxes (1008, ..., 1010) via local cable infrastructure 1012.

Headend 1006 includes a receiver module 1014 and a local cable distribution module 1016 coupled together via bus 1018. Receiver module 1014 receives signals (1026, ..., 1028) from content providers (1002, ..., 1004). For example, content provider 1 1002 may be a satellite broadcasting content provider 1 downlink TV program signals to receiver module 1014; content provider n 1004 may be a ground based transmission source transmitting content provider 2 TV program signals to receiver module 1014, e.g., via a fiber optic link or microwave link. Local cable distribution module 1016 interfaces with receiver module 1014, e.g., receiving TV program information corresponding to a plurality of channels, and interfaces with the local cable infrastructure 1012. Via infrastructure 1012, module 1016 is coupled to set-top boxes (1008, 1010). Local cable distribution module 1016 includes a scrambling/descrambling module 1020, e.g., for supporting TV signals over IP networks, i.e., IPTV. Scrambling/descrambling module 1020, determines initialization vectors, scrambles transports stream packets to be transmitted, and descrambles received scrambled transport stream packets.

Each set-top box (1008, 1010) includes a scrambling/descrambling module (1022, 1024), respectively. Scrambling/descrambling module (1022, 1024) supports IPTV communications, e.g., determining initialization vectors, scrambling transports stream packets to be transmitted, and descrambling received scrambled transport stream packets.

Figure 11A:
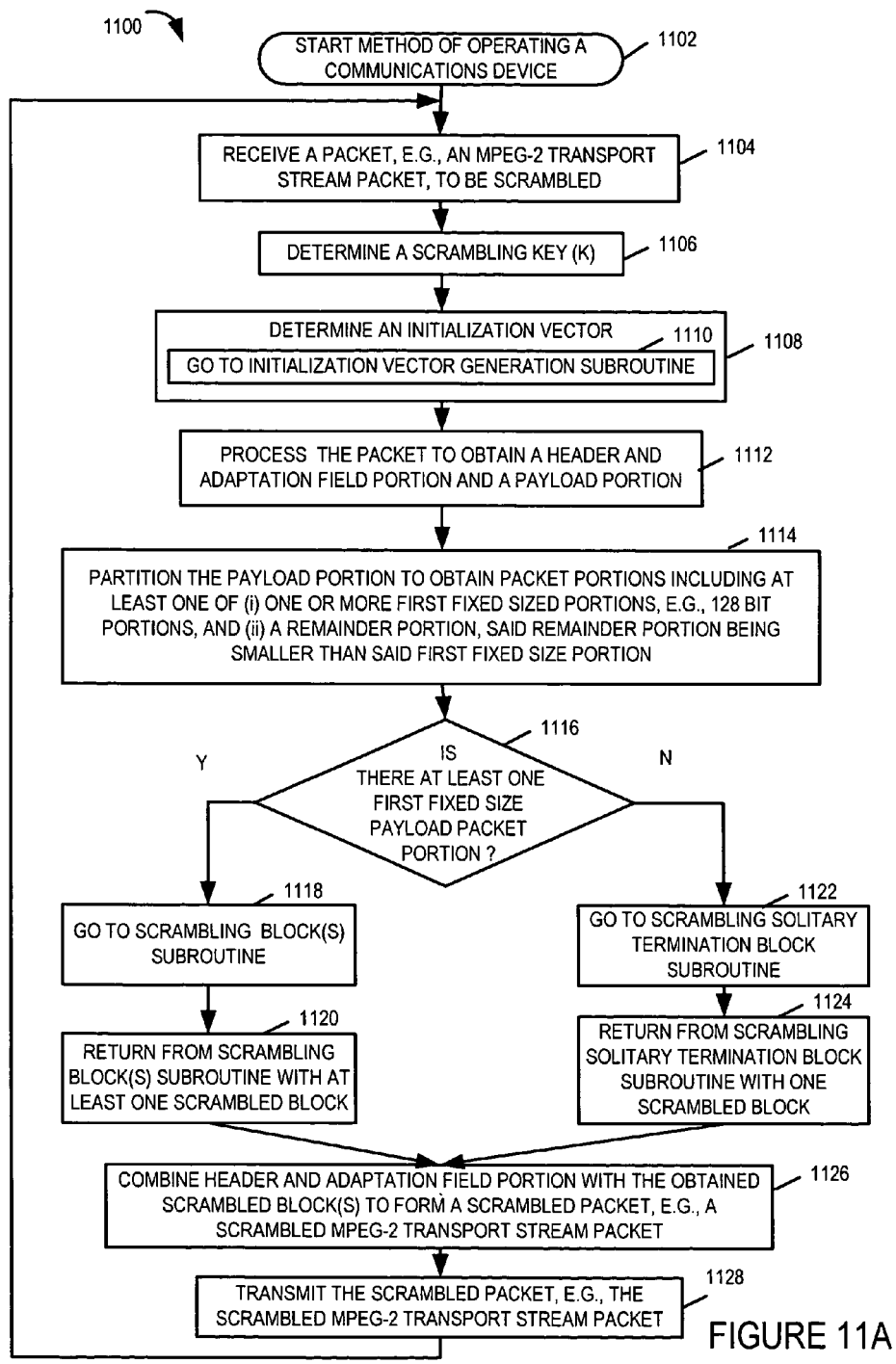
FIG. 11, comprising the combination of FIG. 11A, FIG. 11B, FIG. 11C and FIG. 11D, is a drawing of a flowchart of an exemplary method of operating a communications device in accordance with various embodiments, said method including scrambling.
Figure 11B:
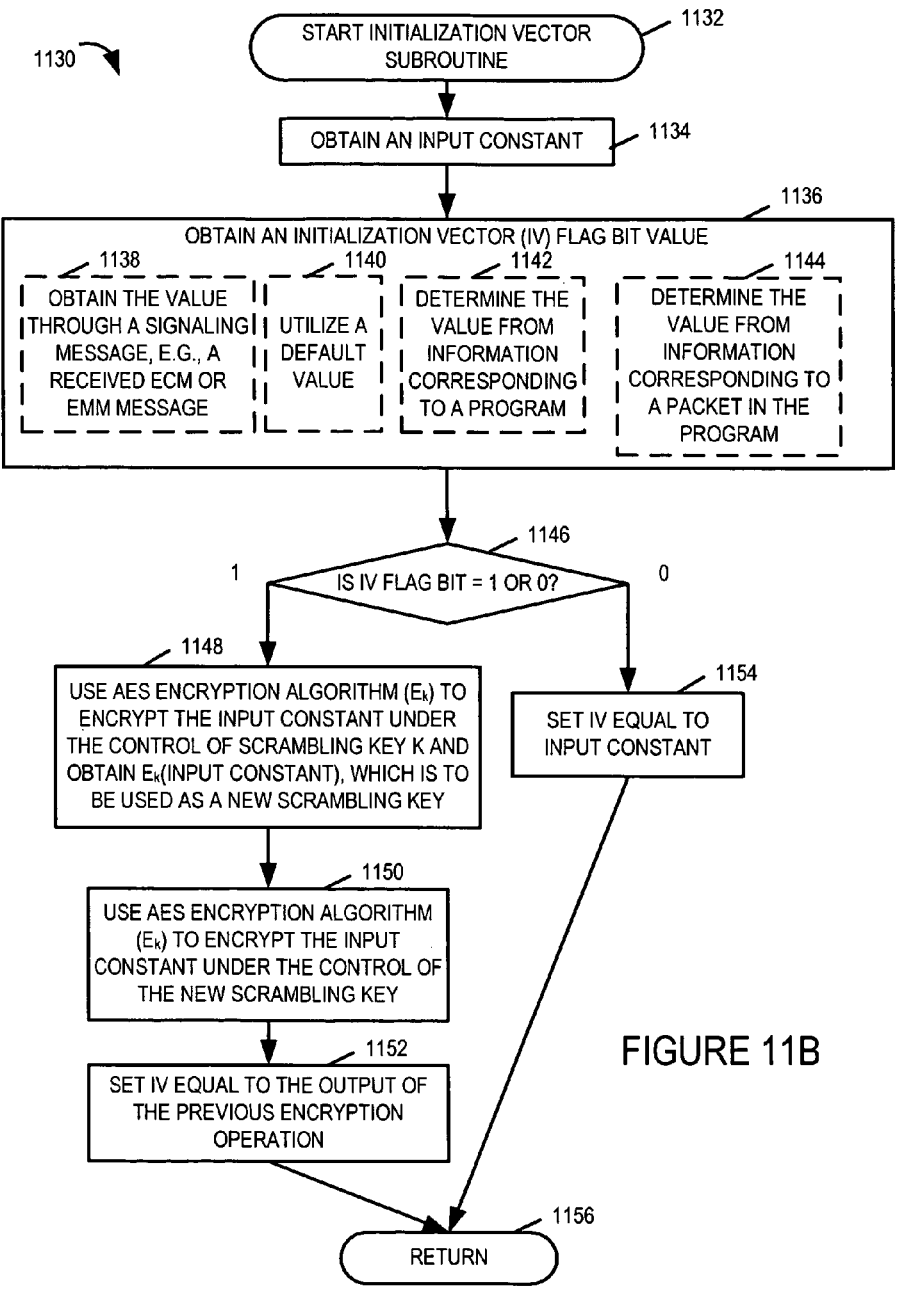
Figure 11C:
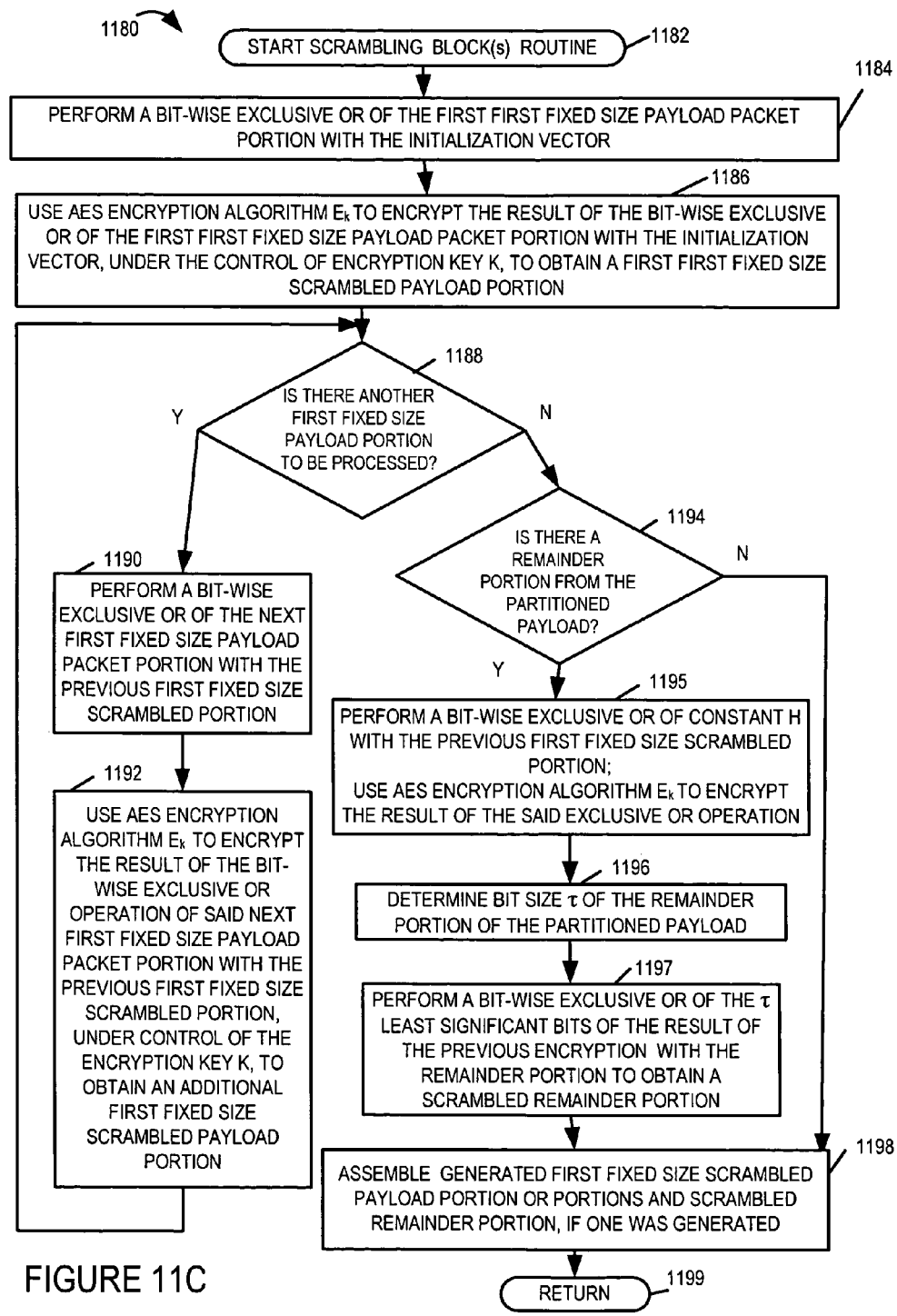
Figures 11, 11D:
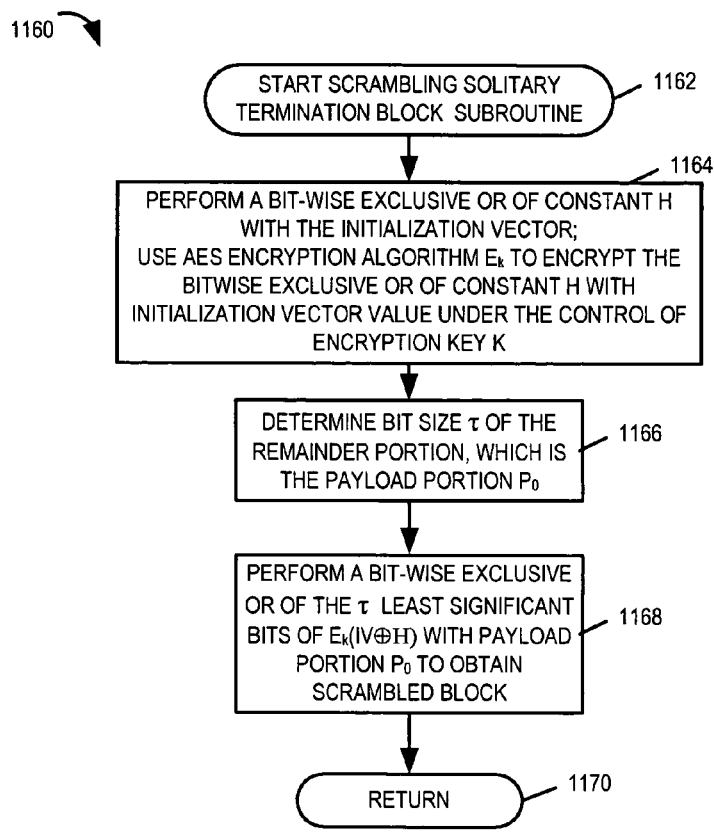
Figure 12A:
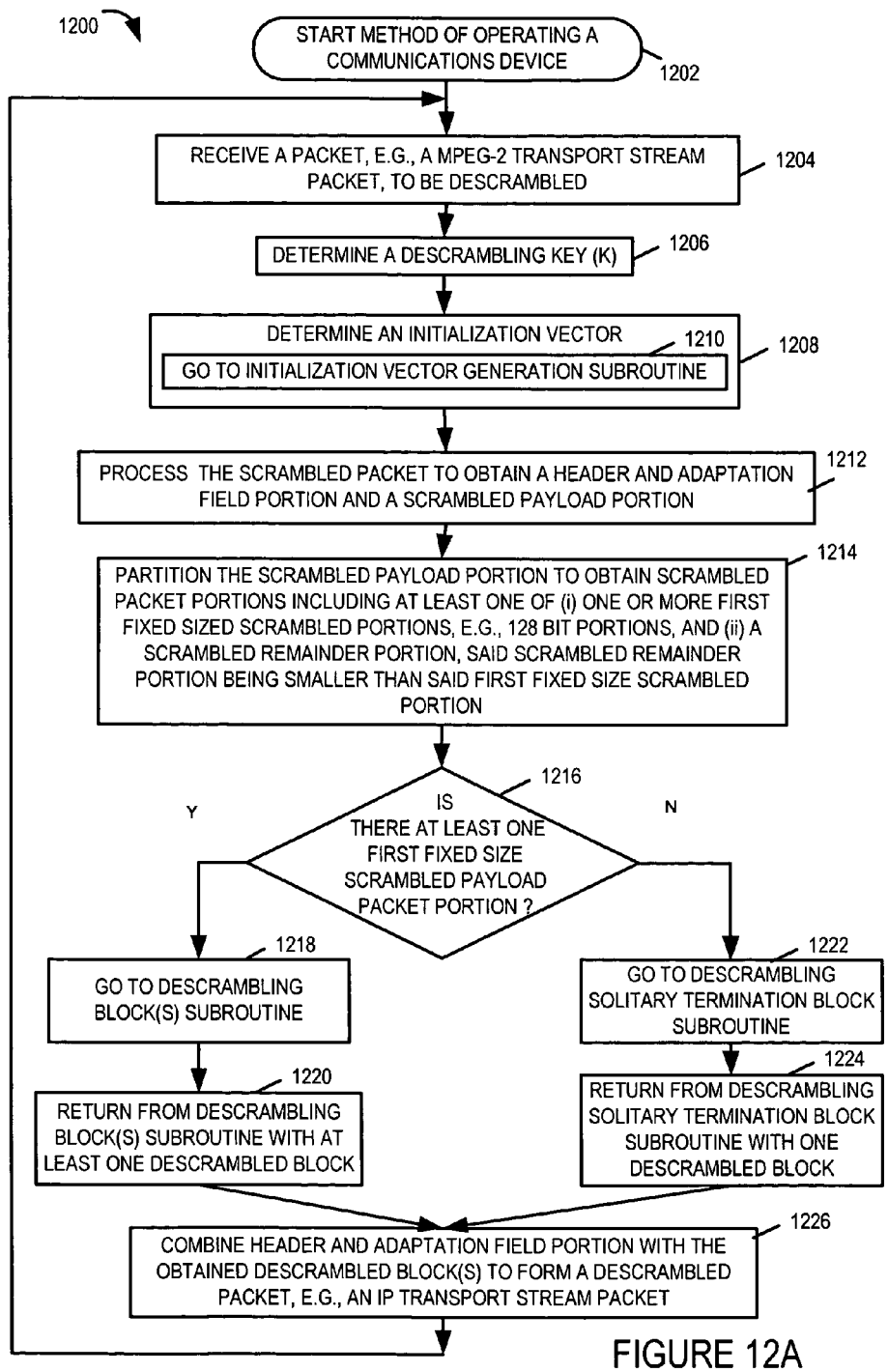
FIG. 12, comprising the combination of FIG. 12A, FIG. 12B, FIG. 12C and FIG. 12D, is a drawing of a flowchart 1200 of an exemplary method of operating a communications device in accordance with various embodiments, said method including descrambling.
Figure 12B:
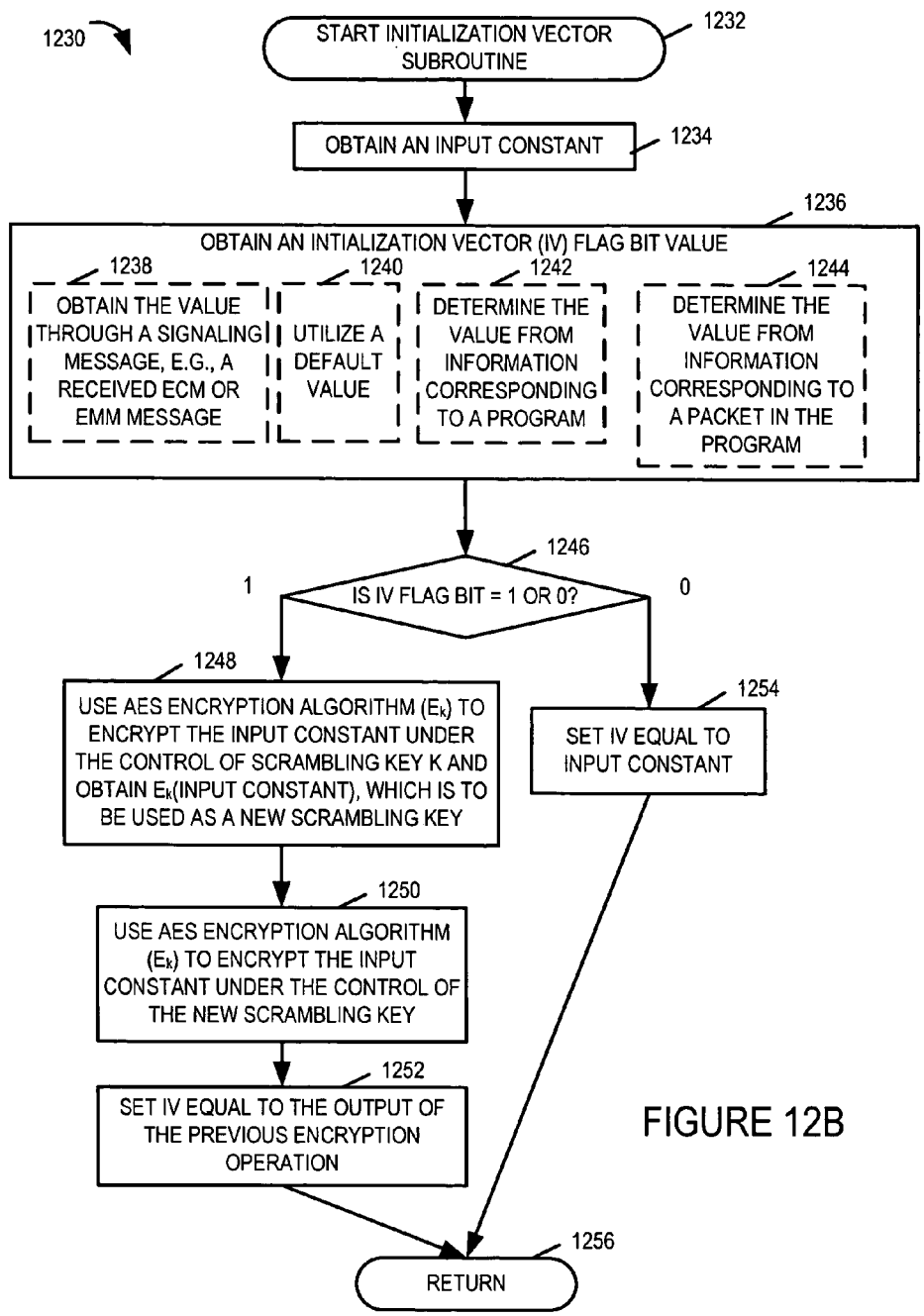
Figure 12C:
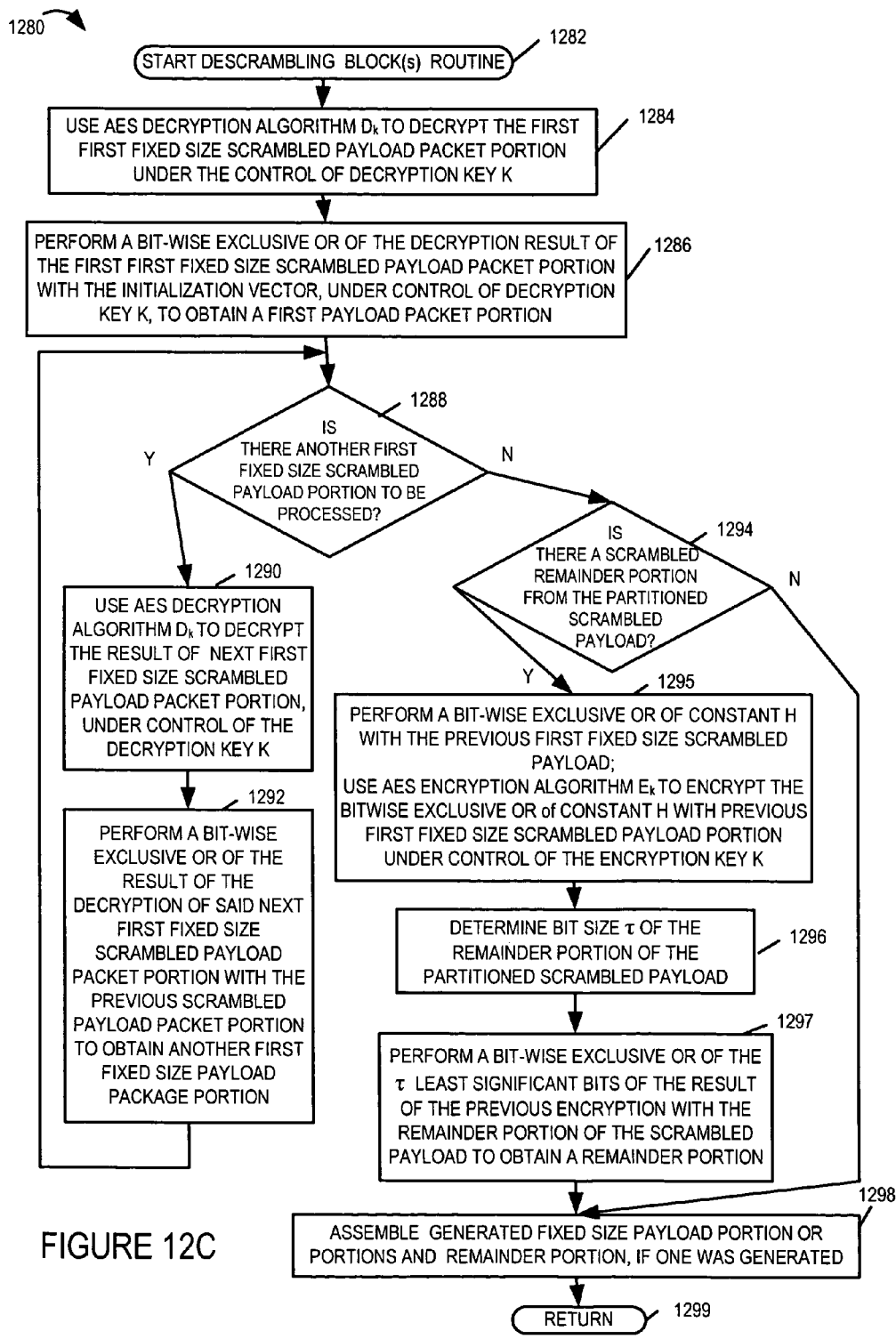
Figure 12D:
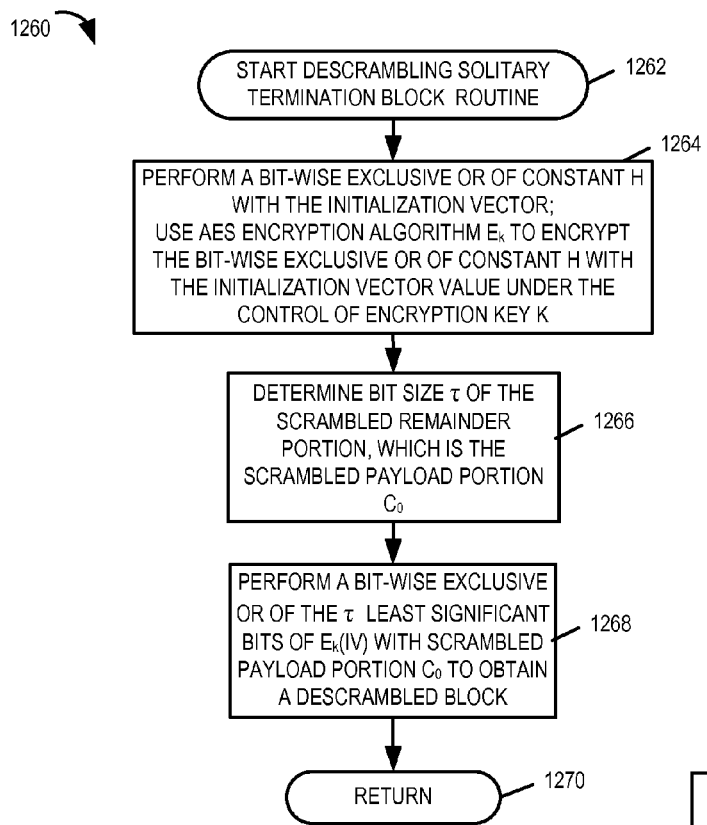

FIG. 11, comprising the combination of FIG. 11A, FIG. 11B, FIG. 11C and FIG. 11D, is a drawing of a flowchart 1100 of an exemplary method of operating a communications device in accordance with various embodiments. Operation starts in step 1102, where the communications device is powered on and initialized. Operation proceeds from start step 1102 to step 1104. In step 1104, the communications device receives a packet, e.g., a MPEG-2 transport stream packet to be scrambled. Operation proceeds from step 1104 to step 1106. In step 1106, the communications device determines a scrambling key K. Operation proceeds from step 1106 to step 1108.

In step 1108, the communications device determines an initialization vector. Step 1108 includes sub-step 1110, in which operation proceeds to an initialization vector subroutine, e.g., initialization vector subroutine of flowchart 1130.

The initialization vector subroutine of flowchart 1130 will now be described. Operation starts in step 1132 and proceeds to step 1134, in which the communications device obtains an input constant. Then, in step 1136, the communication device obtains an initialization vector (IV) flag bit value. Four alternative sub-steps (1138, 1140, 1142, 1144) are shown in step 1136 which may be used to obtain the initialization vector flag bit value. In sub-step 1138, the communications device obtains the value through a signaling message, e.g., a received ECM or EMM message. In sub-step 1140, the communications device utilizes a default value, e.g., a stored default value. In sub-step 1142, the communications device determines the value from information corresponding to a program. In sub-step 1144, the communications device determines the value from information corresponding to a packet in the program. Operation proceeds from step 1136 to step 1146. In step 1146, the communications device proceeds along different paths as a function of the value of the initialization vector flag bit. If the IV flag bit=1 operation proceeds from step 1146 to step 1148; however if the IV flag bit=0, operation proceeds from step 1146 to step 1154.

In step 1148, the communications device uses AES encryption routine ($E_k$) to encrypt the input constant, obtained in step 1134, under control of scrambling key K to obtain $E_k$(Input Constant), which is to be used as a new scrambling key. Then in step 1150, the communications device uses AES encryption algorithm ($E_k$) to encrypt the input constant under control of the new scrambling key, the new scrambling key obtained from step 1148. Next, in step 1152, the communications device sets the initialization vector to the output of the encryption operation of step 1150.

Returning to step 1154, in step 1154, the communications device sets the initialization vector equal to the input constant of step 1134. Operation proceeds from one of steps 1152 or step 1154 to return step 1156. In step 1156, the initialization vector routine returns a value for the initialization vector and operation proceeds back to the main routine, e.g., back to step 1108 of flowchart 1100.

Operation proceeds from step 1108 to step 1112. In step 1112, the communications device processes the packet of step 1104, to obtain a header and adaptation field portion and a payload portion. Next, in step 1114, the communications device partitions the payload portion to obtain packet portions including at least one of (i) one or more first fixed size portions, e.g., 128 bit portions, and (ii) a remainder portion, said remainder portion being smaller than said first fixed size portion.

Next, in step 1116, the communications device determines whether there is at least one first fixed size payload packet portion. If it is determined that there is at least one first fixed size payload packet portion, then operation proceeds from step 1116 to step 1118, where operation is directed to scrambling block(s) subroutine; otherwise, operation proceeds from step 1116 to step 1122, where operation is directed to scrambling solitary termination block subroutine.

Exemplary scrambling blocks subroutine of flowchart 1180 will now be described. In flowchart 1180, the communications device starts scrambling block(s) subroutine in step 1182 and proceeds to step 1184. In step 1184, the communications device performs a bit-wise exclusive OR of the first first fixed size payload packet portion with the initialization vector. Then, in step 1186, the communications device uses AES encryption algorithm $E_k$ to encrypt the result of the bit-wise exclusive OR of the first first fixed size payload packet portion with the initialization vector (step 1184 result), under control of encryption key K, to obtain a first first fixed size scrambled payload portion.

Operation proceeds from step 1186 to step 1188. In step 1188 the communications device determines whether there is another first fixed size payload portion to be processed. If there is another first fixed size payload portion to be processed, then operation proceeds from step 1188 to step 1190; otherwise, operation proceeds from step 1188 to step 1194.

In step 1190, the communications device, performs a bit-wise exclusive OR of the next first fixed size payload packet portion with the previous first fixed size scrambled portion, e.g., $P_2$ with $C_1$ for the first iteration of step 1190. Operation proceeds from step 1190 to step 1192. In step 1192, the communications device uses AES encryption algorithm $E_k$ to encrypt the result of the bit-wise exclusive OR of said next first fixed size payload packet portion with the previous first fixed size scrambled portion (result from step 1190), under control of encryption key K, to obtain an addition fixed size scrambled payload portion, e.g., obtains $C_2$ for the first iteration of step 1192. Operation proceeds from step 1192 to step 1188, where the communications device considers as to whether or not there is another first fixed size payload portion to be processed.

In step 1194, the communications device proceeds along different paths depending upon whether or not there is a remainder portion from the partitioned payload. If there is a remainder portion, then operation proceeds from step 1194 to step 1195; otherwise operation proceeds from step 1194 to step 1198.

In step 1195, the communications device performs a bit-wise exclusive OR of the input constant H with the previous first fixed size scrambled portion. Then the communications device uses AES encryption algorithm $E_k$ to encrypt the result of the exclusive OR of the input constant H and the previous first fixed size scrambled payload portion (the result of the last iteration of step 1192), under control of the encryption key K. Operation proceeds from step 1195 to step 1196. In step 1196, the communications device determines the bit size τ of the remainder portion of the partitioned payload. Then in step 1197, the communications device performs a bit-wise exclusive OR of the τ least significant bits of the result of the said encryption with the remainder portion to obtain a scrambled remainder portion. Thus step 1197 performs a bit wise exclusive OR of the τ least significant bits from the result of step 1195 with the remainder portion to obtain a scrambled remainder portion. Operation proceeds from step 1197 to step 1198.

In step 1198, the communications device assembles the generated first fixed size scrambled payload portion or portions and the scrambled remainder portion, if a scrambled remainder portion was generated. Next, in step 1199, the scrambling block(s) subroutine returns one or more blocks of scrambled payload, e.g., one scrambled fixed size payload portion, and at some times, additional scrambled fixed size payload portion(s), and at some times, a scrambled remainder portion.

Exemplary scrambling solitary termination block subroutine of flowchart 1160 will now be described. In flowchart 1160, the communications device starts scrambling solitary termination block subroutine in step 1162 and proceeds to step 1164. In step 1164, the communications device performs a bit-wise exclusive OR of input constant H with the initialization vector, IV. Then the communications device uses AES encryption algorithm $E_k$ to encrypt the result of the bit-wise exclusive OR of the input constant H and the initialization vector IV under the control of the encryption key K. Then, in step 1166, the communications device determines the bit size τ of the remainder portion, which is the payload portion, e.g., solitary termination block payload portion $P_0$. Next, in step 1168, the communications device performs a bit-wise exclusive OR operation of the τ least significant bits of $E_k(IV \oplus H)$ with payload portion $P_0$ to obtain a scrambled block. Then in step 1170, operation returns from the scrambling termination block subroutine returning the obtained scrambled block of step 1168 to the main program.

Returning to step 1118, from step 1118, operation proceeds to step 1120, where the communications device returns from the scrambling block(s) subroutine with at least one scrambled block. Returning to step 1122, from step 1122, operation proceeds to step 1124, where the communications device returns from the scrambling solitary termination block routine with one scrambled block. Operation proceeds from step 1120 or step 1124 to step 1126, where the communications device combines the header and adaptation field portion with the obtained scrambled block(s) to form a scrambled packet, e.g., a scrambled MPEG-2 transport stream packet. Then, in step 1128, the communications device transmits the scrambled packet, e.g., the scrambled MPEG-2 transport stream packet.

FIG. 12, comprising the combination of FIG. 12A, FIG. 12B, FIG. 12C and FIG. 12D, is a drawing of a flowchart 1200 of an exemplary method of operating a communications device in accordance with various embodiments. Operation starts in step 1202, where the communications device is powered on and initialized. Operation proceeds from start step 1202 to step 1204. In step 1204, the communications device receives a packet, e.g., a MPEG-2 transport stream packet to be descrambled. Operation proceeds from step 1204 to step 1206. In step 1206, the communications device determines a descrambling key K. Operation proceeds from step 1206 to step 1208.

In step 1208, the communications device determines an initialization vector. Step 1208 includes sub-step 1210, in which operation proceeds to an initialization vector subroutine, e.g., initialization vector subroutine of flowchart 1230.

The initialization vector subroutine of flowchart 1230 will now be described. Operation starts in step 1232 and proceeds to step 1234, in which the communications device obtains an input constant. Then, in step 1236, the communication device obtains an initialization vector (IV) flag bit value. Four alternative sub-steps (1238, 1240, 1242, 1244) are shown in step 1236 which may be used to obtain the initialization vector flag bit value. In sub-step 1238, the communications device obtains the value through a signaling message, e.g., a received ECM or EMM message. In sub-step 1240, the communications device utilizes a default value, e.g., a stored default value. In sub-step 1242, the communications device determines the value from information corresponding to a program. In sub-step 1244, the communications device determines the value from information corresponding to a packet in the program. Operation proceeds from step 1236 to step 1246. In step 1246, the communications device proceeds along different paths as a function of the value of the initialization vector flag bit. If the IV flag bit=1 operation proceeds from step 1246 to step 1248; however if the IV flag bit=0, operation proceeds from step 1246 to step 1254.

In step 1248, the communications device uses AES encryption routine ($E_k$) to encrypt the input constant, obtained in step 1234, under control of scrambling key K to obtain $E_k$(Input Constant), which is to be used as a new scrambling key. Then in step 1250, the communications device uses AES encryption algorithm ($E_k$) to encrypt the input constant under control of the new scrambling key, the new scrambling key obtained from step 1248. Next, in step 1252, the communications device sets the initialization vector to the output of the encryption operation of step 1250.

Returning to step 1254, in step 1254, the communications device sets the initialization vector equal to the input constant of step 1234. Operation proceeds from one of steps 1252 or step 1254 to return step 1256. In step 1256, the initialization vector subroutine returns a value for the initialization vector and operation proceeds back to the main routine, e.g., back to step 1208 of flowchart 1200.

Operation proceeds from step 1208 to step 1212. In step 1212, the communications device processes the scrambled packet of step 1204, to obtain a header and adaptation field portion and a scrambled payload portion. Next, in step 1214, the communications device partitions the scrambled payload portion to obtain packet portions including at least one of (i) one or more first fixed size scrambled portions, e.g., 128 bit portions, and (ii) a scrambled remainder portion, said scrambled remainder portion being smaller than said first fixed size scrambled portion.

Next, in step 1216, the communications device determines whether there is at least one first fixed size scrambled payload packet portion. If it is determined that there is at least one first fixed size scrambled payload packet portion, then operation proceeds from step 1216 to step 1218, where operation is directed to descrambling block(s) subroutine; otherwise, operation proceeds from step 1216 to step 1222, where operation is directed to descrambling solitary termination block subroutine.

Exemplary descrambling blocks subroutine of flowchart 1280 will now be described. In flowchart 1280, the communications device starts descrambling block(s) subroutine in step 1282 and proceeds to step 1284. In step 1284, the communications device uses AES decryption algorithm $D_k$ to decrypt the first first fixed size scrambled payload packet portion under the control of the decryption key K. Then, in step 1286, the communications device performs a bit-wise exclusive OR operation of the decryption result of the first first fixed size scrambled payload package portion (result from step 1284) and the initialization vector, under the control of decryption key K, to obtain a first payload packet portion. Operation proceeds from step 1286 to step 1288.

In step 1288, the communications device, checks as to whether there is another first fixed size scrambled payload portion to be processed. If there is another first fixed size scrambled payload portion to be processed, operation proceeds from step 1288 to step 1290; otherwise operation proceeds from step 1288 to step 1294.

In step 1290, the communications device uses AES decryption algorithm $D_k$ to decrypt the result of the next first fixed size scrambled payload package portion, under control of decryption key K. Then, in step 1292, the communications device performs a bit-wise exclusive OR of the result of the decryption of said next first fixed size scrambled payload package portion with the previous scrambled payload portion to obtain another first size payload portion. Operation proceeds from step 1292 to step 1288, where the communications device checks as to where there are any additional first fixed size payload portions remaining to be processed.

In step 1294, the communications device checks if there is a scrambled remainder portion from the partitioned scrambled payload. If there is a scrambled remainder payload portion, then operation proceeds from step 1294 to step 1295; otherwise operation proceeds from step 1294 to step 1298. In step 1295, the communications device performs a bit-wise exclusive OR of input constant H with the previous first fixed size scrambled payload portion. Then the communications device uses AES encryption algorithm $E_k$ to encrypt the bit-wise exclusive OR of input constant H and the previous first fixed size scrambled payload portion. Then, in step 1296, the communications device determines the bit size $\tau$ of the remainder portion of the partitioned scrambled payload. Next, in step 1297, the communications device performs a bit-wise exclusive OR of the $\tau$ least significant bits of the result of the said encryption with the remainder portion of the scrambled payload to obtain a remainder portion. Operation proceeds from step 1297 to step 1298.

In step 1298 the communications device assembles the generated fixed size payload portion or portions and, and a remainder portion if a remainder portion was generated. Next, in step 1299, the descrambling block(s) routine returns one or more blocks of descrambled payload, e.g., a first fixed size payload portion, and at some times, one or more additional first fixed size payload portions, and at some times, a remainder payload portion.

Exemplary descrambling solitary termination block subroutine of flowchart 1260 will now be described. In flowchart 1260, the communications device starts descrambling solitary termination block subroutine in step 1262 and proceeds to step 1264. In step 1264, the communications device performs a bit-wise exclusive OR of input constant H with the initialization vector IV. Then the communications device uses AES encryption algorithm $E_k$ to encrypt the bit-wise exclusive OR of input constant H with the initialization vector IV under the control of the encryption key K. Then, in step 1266, the communications device determines the bit size $\tau$ of the remainder portion, which is the scrambled payload portion, e.g., solitary termination block scrambled payload portion $C_0$. Next, in step 1268, the communications device performs a bit-wise exclusive OR operation of the $\tau$ least significant bits of $E_k(IV \oplus H)$ with scrambled payload portion $C_0$ to obtain a descrambled block. Then in step 1270, operation returns from the descrambling termination block subroutine returning the obtained block of step 1268 to the main program.

Returning to step 1218, from step 1218, operation proceeds to step 1220, where the communications device returns from the descrambling block(s) routine with at least one descrambled block. Returning to step 1222, from step 1222, operation proceeds to step 1224, where the communications device returns from the descrambling solitary termination block routine with one descrambled block. Operation proceeds from step 1220 or step 1224 to step 1226, where the communications device combines the header and adaptation field portion with the obtained descrambled block(s) to form a descrambled packet, e.g., an IP transport stream packet. Operation proceeds from step 1226 to step 1204, where another packet is received to be processed and descrambled.

In some embodiments, various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., a general purpose computer with or without additional hardware, to implement all or portions of the above described methods, e.g., in one or more nodes. Accordingly, among other things, the present application is directed to a machine-readable medium including machine executable instructions for causing a machine, e.g., processor and associated hardware, to perform one or more of the steps of the above-described method(s).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of processing a first packet including a first portion including at least one header field and a payload portion, the method comprising utilizing a hardware module for:
   generating an encryption initialization vector by controllable selecting, under control of an initialization vector flag, between at least a first and second initialization value, wherein the first value is generated by performing an encryption operation on a third constant, using a generated encryption control key by performing an encryption operation on said third constant under control of another encryption control key; and
   performing an encryption operation on at least a portion of said payload portion as a function of said generated encryption initialization vector.

2. The method of claim 1, wherein said initialization vector flag is received in an MPEG-2 transport stream.

3. The method of claim 1, wherein said initialization vector flag is used to process packets included in an MPEG-2 program stream.

4. The method of claim 1, wherein said initialization vector flag is updated on a per packet basis.

5. A method of processing a first packet including a scrambled packet payload including a first scrambled block of a first predetermined size and one scrambled remainder block of a second size which is less than said first predetermined size, the method comprising operating a communications device to:
  subject the first scrambled block to a decryption operation to produce a first decrypted result;
  perform a first exclusive ORing operation using the first decrypted result to produce a first descrambled payload portion;
  perform a second exclusive ORing operation using the first scrambled block and a constant;
  encrypt the output of the second exclusive ORing; and
  subject the scrambled remainder block to an exclusive ORing operation with the second size number of least significant bits obtained from the encryption operation to produce the remainder payload.

6. The method of claim 5, further comprising:
  combining the first descrambled payload portion and descrambled remainder payload portion with a copy of a header portion obtained from the first packet to generate a second packet including a descrambled payload.

7. The method of claim 6, wherein said decryption operation is an AES decryption operation and wherein said encryption operation is an AES encryption operation.

8. The method of claim 7, wherein said second packet is an MPEG-2 compliant transport packet.

9. The method of 6, further comprising:
  performing said encryption operation, said encryption operation including using a result of an exclusive OR operation of a scrambled payload packet portion located in said first packet immediately preceding the scrambled remainder payload portion with a constant H as an encryption input.

* * * * *